G. G. LEWIS.
BEVERAGE URN.
APPLICATION FILED MAR. 28, 1917.
1,268,858.
Patented June 11, 1918.
2 SHEETS—SHEET 1.
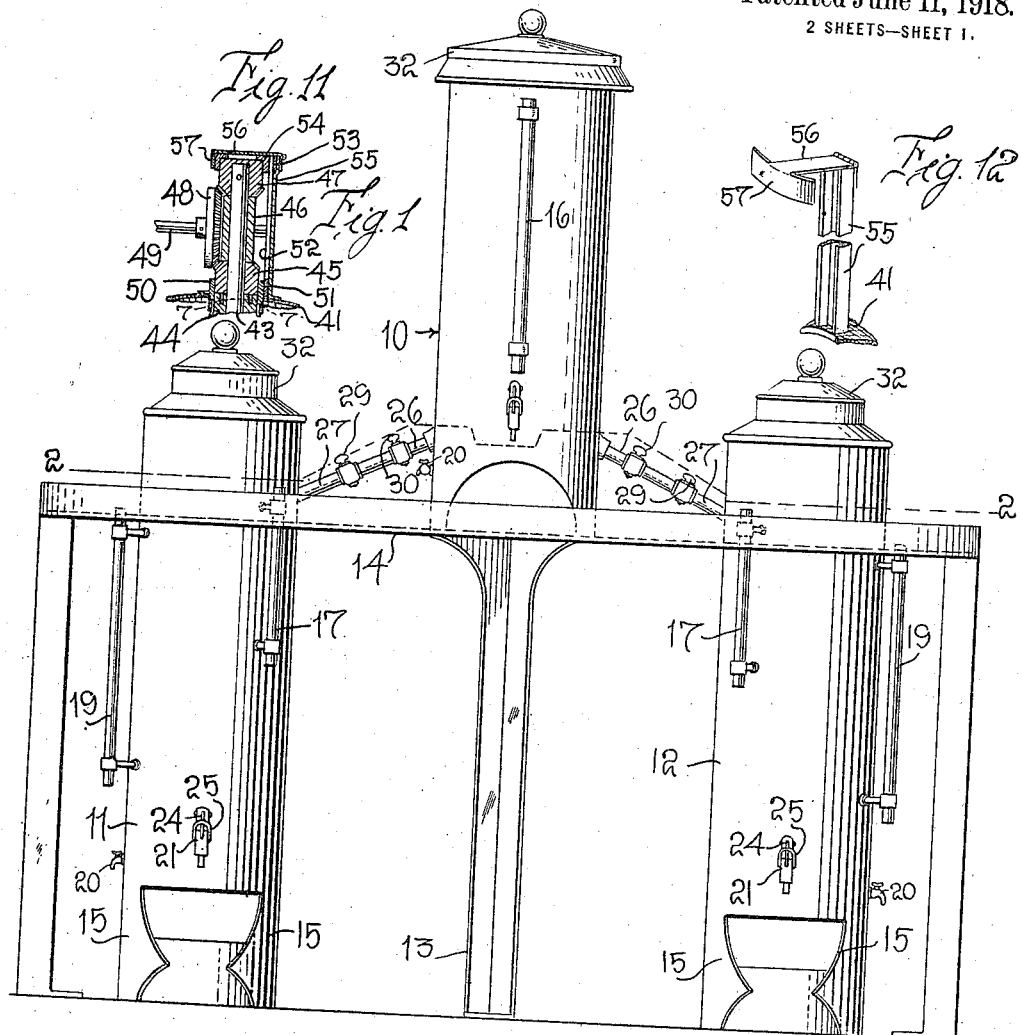
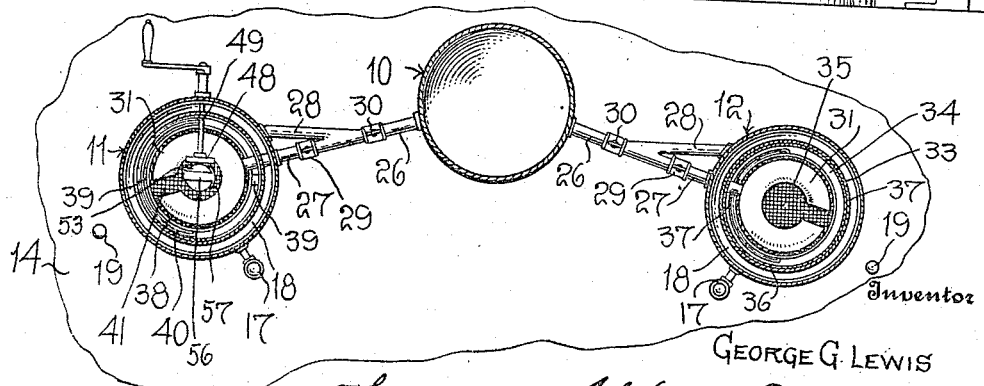
Inventor
GEORGE G. LEWIS
By Watson E. Coleman
Attorney

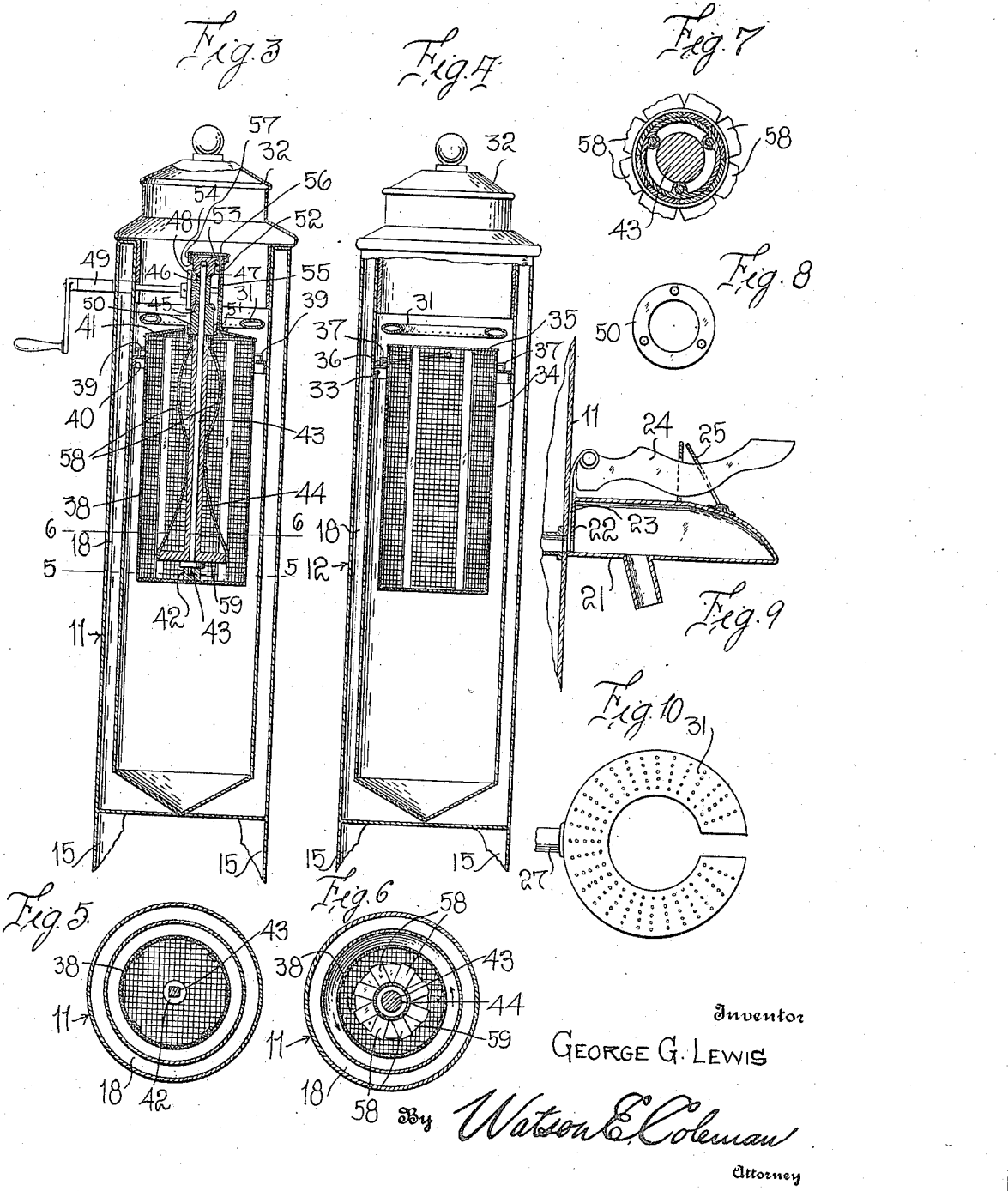

UNITED STATES PATENT OFFICE.

GEORGE G. LEWIS, OF PHILADELPHIA, PENNSYLVANIA.

BEVERAGE-URN.

1,268,858.  Specification of Letters Patent.  Patented June 11, 1918.

Application filed March 28, 1917. Serial No. 158,009.

*To all whom it may concern:*

Be it known that GEORGE G. LEWIS, a citizen of the United States, residing at Philadelphia, in the county of Philadelphia and State of Pennsylvania, has invented certain new and useful Improvements in Beverage-Urns, of which the following is a specification, reference being had to the accompanying drawings.

This invention relates to cooking utensils, and particularly to coffee and tea urns.

The general object of the invention is the provision of a combination hot water boiler, coffee urn and tea urn, together with means whereby the liquids may be withdrawn from their respective urns and with a further provision whereby hot water may be, at any time, sprayed upon the coffee or the tea.

A further object of the invention is the provision of means within the coffee urn whereby the coffee may be agitated without the necessity of removing the lid from the coffee urn, and in this connection to provide means whereby the reticulated basket which contains the coffee may be rotated in one direction, and the beaters disposed within the reticulated basket may be rotated in the other direction.

A further object is to provide in connection with a tea urn a reticulated basket for containing the tea, which is readily removable from the tea urn and to provide means whereby hot water may be conducted in any desired quantities into the tea urn to thereby cause the steeping of the tea.

A further object is to provide both the tea and coffee urn with jackets between which hot water may circulate from the water boiler to thus keep the tea and coffee at a proper temperature.

Other objects relate to the details of construction and arrangement of parts as will be later stated.

My invention is illustrated in the accompanying drawings, in which:—

Figure 1 is a front elevation of my improved hot water, coffee, and tea urn.

Fig. 2 is a section on the line 2—2 of Fig. 1.

Fig. 3 is a vertical sectional view through the coffee urn.

Fig. 4 is a vertical sectional view through the tea urn.

Fig. 5 is a vertical sectional view on the line 5—5 of Fig. 3.

Fig. 6 is a sectional view on the line 6—6 of Fig. 3.

Fig. 7 is a sectional view on the line 7—7 of Fig. 11.

Fig. 8 is an underside plan view of the member 50.

Fig. 9 is a vertical longitudinal sectional view through one of the faucets or valves, a portion of the casing 11 being also shown in section.

Fig. 10 is an underside plan view of one of the sprayers.

Fig. 11 is a detailed vertical sectional view through the mechanism for rotating the coffee basket and the agitator.

Fig. 12 is a fragmentary perspective view of the cover 41, supporting bar 55, and the hinged clip thereof.

Referring to the drawings, it will be seen that my improved construction comprises a hot water boiler 10, the coffee urn 11, and a tea urn 12. The boiler 10 is disposed at a higher level than either of the urns 11 and 12 and is supported upon a leg 13 while the boiler and the several urns are connected to each other by means of a supporting web 14 constituting a very convenient shelf for the reception of cups and saucers. The coffee and tea urns 11 and 12 are each supported with its bottom above the level of the table by the supporting members 15 and this permits a gas flame or an alcohol lamp to be disposed beneath either of the urns, if desired. The hot water boiler is provided with a gage glass 16 and each of the urns is provided with a gage glass 17 connected at its upper ends to the water space 18 between the outer and inner walls of the urn and with a gage glass 19 which is connected to the space inclosed by the inner wall of the urn, the last named gage glass showing the height of coffee or tea in the urn. Leading from the space 18 is a spigot 20 controlled by a suitable valve, of any ordinary form, and leading from the interior of each of the urns is a spigot 21 whereby the coffee or tea may be drawn off from the urn. Preferably the valves controlling these spigots are so arranged that they may be locked in an open position so as to permit the passage of liquid without the necessity of manually holding the valve open.

While I do not wish to be limited to any particular form of spigot, I have illustrated each spigot 21 as having a body provided at its rear end with a valve seat 22 for a vertically sliding valve 23, which valve is connected to a lever 24 which rocks upon the body of the faucet, a spring being provided for the closing of the valve and a loop 25 being provided to engage the lever and hold the valve in its open position. All of the spigots on the several urns are constructed in the same manner.

The boiler 10 is connected to each of the urns 11 and 12 by means of a pipe 26, the pipe at its end toward the urn being provided with branches 27 and 28, the branch 27 entering the interior of the urn, while the branch 28 enters the water space surrounding the urn. The branch 27 is provided with a valve 29 and the pipe 26 is provided with a valve 30. The extremity of the branch 27 within the urn 11 or urn 12 is formed with a sprinkler head 31 which is formed of two semi-circular hollow portions suitably perforated to permit the passage of water. Of course the boiler 10 and the urns 11 and 12 are all provided with the lids 32, of any ordinary or suitable construction.

The tea urn 12 is provided on its inside face with an annular flange 33 and adapted to be supported on this flange is the tea basket or cage 34 which is preferably formed of wire gauze braced by metallic strips in any suitable manner, this basket 34 being provided with a reticulated cover 35 and with a bail 36. At intervals the basket is provided with downwardly extending lugs 37 which are adapted to engage over the flange 33. The bottom of the basket is also formed of wire gauze. In its normal position the basket is inserted in the urn, the sprinkler head being first removed and then when the basket is in position, the sprinkler head is replaced in a position above the basket so as to discharge downward thereon.

The coffee urn is preferably provided with a coffee containing basket 38 of wire gauze and with means whereby the coffee within the basket may be agitated so as to bring every particle of the coffee into contact with the hot water. This is particularly illustrated in Fig. 3. As before stated, the coffee containing basket which is made of wire gauze is designated 38 and has at its upper end the outwardly projecting lugs 39 engageable with an annular track 40 formed by a flange on the inner face of the coffee urn. The upper end of the basket 38 is closed by a cap of wire gauze designated 41, this cap being annular in form. The bottom of the basket 38 is formed with a socket 42 preferably square in cross section, and engaging this socket is the square head of a vertically disposed shaft 43 which extends out through the opening in the center of the cap 41. Surrounding the shaft 43 is a sleeve 44 which sleeve carries upon it a plurality of agitating blades. This sleeve at its upper end is operatively connected to an annular beveled gear wheel 45 and surrounding the shaft 43 above the gear wheel 45 is a sleeve 46. Disposed on the shaft 43 above the sleeve 46 is a beveled gear wheel 47 and meshing with these beveled gear wheels is a driving beveled gear wheel 48 which is rotatably supported upon the sleeve 46 and has a shaft 49 extending out through a slot in the cover of the coffee urn, this shaft being provided with a handle whereby it may be rotated. It will thus be seen that a rotation of the shaft 49 will cause a rotation of the sleeve 44 and also of the agitators connected thereto and will also cause a reverse rotation of the shaft 43. Preferably an annular collar 50 is disposed below the gear wheel 45, this annular collar having a lug 51 and from this lug extends upward a supporting bar 52 which at its upper end is connected to a lug 53 in turn connected to a collar 54 disposed above the upper gear wheel 47. Attached to the cap 41 which covers the upper end of the coffee container or basket is an upwardly extending channel bar 55 adapted to receive and fit over the bar 52 and hingedly connected to the upper end of this bar 55 is an arm 56 which at its extremity has an angularly disposed arcuate member 57 which when bent over upon the cap 54 holds the channel bar 55 in engagement with the bar 52 and thus prevents any rotation of the cap 41 but permits a rotation of the coffee basket.

The agitators which are to be attached to the sleeve 44 may be of any suitable construction, but I have illustrated them as metallic strips 58 attached at their upper ends to the upper end of the sleeve 44 extending downward and attached midway of their length to the sleeve 44 and then extending downward and outward and attached at their lower ends to a disk 59. It will be seen that when the crank shaft 49 is operated the beaters will move in one direction and the coffee container will move in the opposite direction and that thus the coffee will be very much agitated.

The means for agitating the powdered coffee within the reticulated coffee container or basket does away with the necessity of removing the cover from the urn in order to stir the coffee up and let the water have access to every particle of coffee. Thus a great saving is accomplished in the amount of coffee used as the entire strength of the coffee is secured. It will be understood, of course, that the sprayer or sprinkler head being approximately annular in form surrounds the mechanism for rotating the agitator and is disposed just above the cap. It will be seen also that the cap supports the agitating devices so that when the cap is removed the agitating devices are removed also to permit the insertion of the powdered coffee within the coffee basket. With my construction the coffee or tea or both are kept hot and in proper condition for use by the hot water container between the double walls of the urns and that this hot water may be drawn off from time to time, as desired, through the proper spigots or tops and that either urn may be cut off from communication with the boiler whenever desired and that hot water may be let in at any time either to the tea urn or to the coffee urn. It will further be seen that after the tea and coffee are placed in their respective baskets that there will be no necessity of removing the lids from the urns and thus there will be no chance for the aroma of the coffee or tea to escape.

It will also be seen that my device is very convenient, is extremely simple and is eminently fitted for the purpose for which it is designed.

Having thus described my invention, what I claim is:—

1. In a coffee urn, an annular flange forming a track extending around the interior of the urn, a reticulated coffee receptacle rotatably mounted on the track, a reticulated cap for closing the upper end of the receptacle, a shaft extending through the receptacle and operatively engaging the lower end thereof for unitary rotative movement, a sleeve rotatably mounted upon the shaft, manually operable means for rotating the shaft and the sleeve in opposite directions simultaneously, and means for supporting the cap from rotation.

2. In a coffee urn, an annular flange on the interior of the urn, a reticulated basket supported on said flange for rotation, an annular reticulated cap for the basket having an upwardly extending channel bar, a shaft extending through the basket and detachably engaging the lower end of the basket for unitary rotative movement, a sleeve surrounding the shaft and provided with agitator blades, vertically spaced collars through which the shaft passes, beveled gear wheels surrounding the shaft inward of said collars, one of the beveled gear wheels being connected to the sleeve and the other to the shaft, a sleeve surrounding the wheeled portion of the shaft and holding the beveled gear wheels in spaced relation, a driving beveled gear wheel mounted upon the sleeve and engaging the first named beveled gear wheel and having a shaft extending to the exterior of the urn, caps engaging over the collars and connected to each other by a vertical bar adapted to be disposed within the channel of the bar of the first named cap, and a clip hingedly connected to the upper end of said channel bar and adapted to be engaged over the uppermost collar to hold the parts in operative engagement.

3. In a coffee urn, a reticulated basket for holding coffee, rotatably and removably mounted within the urn, a reticulated cap for said basket, a shaft extending downward through the basket and detachably engaged with the lower end thereof, a sleeve mounted on the shaft and having agitator blades, means for rotating the sleeve in one direction and the basket in an opposite direction, and means for supporting the cap from rotation with the basket.

In testimony whereof I hereunto affix my signature in the presence of two witnesses.

GEORGE G. LEWIS.

Witnesses:
 JOSEPH ROTH,
 LEWIS W. BACON.

Copies of this patent may be obtained for five cents each, by addressing the "Commissioner of Patents, Washington, D. C."